(12) United States Patent
Haakana et al.

(10) Patent No.: US 6,366,955 B1
(45) Date of Patent: Apr. 2, 2002

(54) METHOD FOR CONFIGURING CROSS-CONNECTIONS OF A RADIO SYSTEM AND A RADIO SYSTEM

(75) Inventors: Esa Henrik Haakana, Espoo (FI); Mark Derek Sellin, Twickenham (GB); Esa Markus Metsälä, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/603,058

(22) Filed: Jun. 26, 2000

Related U.S. Application Data

(63) Continuation of application No. PCT/FI99/00891, filed on Oct. 26, 1999.

(30) Foreign Application Priority Data

Oct. 26, 1998 (FI) .................................................. 982321

(51) Int. Cl.$^7$ ............................................. G06F 15/177
(52) U.S. Cl. ...................... 709/221; 709/220; 709/223; 709/224; 709/244; 370/244; 370/254; 370/255; 370/422; 370/442
(58) Field of Search ................................. 709/200–202, 709/220–226, 238, 244; 370/244, 254–255, 351–355, 398, 400, 422, 437, 442, 457

(56) References Cited

U.S. PATENT DOCUMENTS

| | | | | |
|---|---|---|---|---|
| 5,603,085 A | | 2/1997 | Shedlo | ................. 455/33.1 |
| 5,715,245 A | * | 2/1998 | Suonvieri | ................. 370/337 |
| 6,070,188 A | * | 5/2000 | Grant et al. | ................. 709/223 |
| 6,134,238 A | * | 10/2000 | Noh | ................. 370/395 |
| 6,137,782 A | * | 10/2000 | Sharon et al. | ................. 709/221 |
| 6,144,660 A | * | 11/2000 | Torma | ................. 370/380 |
| 5,942,989 A | * | 12/2000 | Nagasawa et al. | ................. 370/255 |
| 6,163,544 A | * | 12/2000 | Andersson et al. | ................. 709/220 |
| 6,286,044 B1 | * | 9/2001 | Aoyama | ................. 709/223 |

FOREIGN PATENT DOCUMENTS

| | | | | |
|---|---|---|---|---|
| WO | WO 96/14720 | 5/1996 | ............ | H04Q/7/34 |
| WO | WO 97/40449 | 10/1997 | ............ | G06F/13/14 |
| WO | WO 98/48583 | 10/1998 | ............ | H04Q/7/38 |
| WO | WO 98/48584 | 10/1998 | ............ | H04Q/7/38 |
| WO | WO 99/11026 | 3/1999 | ............ | H04L/12/40 |
| WO | WO 99/20069 | 4/1999 | ............ | H04Q/7/37 |
| WO | WO 99/56484 | 11/1999 | ............ | H04Q/7/34 |
| WO | WO 99/56485 | 11/1999 | ............ | H04Q/7/34 |
| WO | WO 99/56486 | 11/1999 | ............ | H04Q/7/34 |

\* cited by examiner

*Primary Examiner*—Zarni Maung
*Assistant Examiner*—Bharat Barot
(74) *Attorney, Agent, or Firm*—Altera Law Group, LLC

(57) ABSTRACT

The invention relates to a method for configuring cross-connections of a radio system, and to a radio system implementing the method. The radio system comprises network elements and a network management system managing the network elements. The network elements are operatively interconnected by means of a transmission network realized by transmission circuits. Information between the network elements is transmitted in frames that are divided into time slots. The radio system comprises at least one cross-connection unit between at least two network elements for realizing the cross-connections needed to establish the transmission circuits. The method comprises the following operations: uploading a transmission network topology of the radio system, and utilizing labeled transmission circuits in analyzing the fragmentation of the cross-connections, and optimizing the capacity by reconfiguring the cross-connections when fragmentation of the capacity exceeds an agreed percentage of the total capacity of a circuit.

6 Claims, 5 Drawing Sheets

METHOD FOR CONFIGURING CROSS-CONNECTIONS OF A RADIO SYSTEM AND A RADIO SYSTEM

This application is a continuation of international application serial number PCT/FI99/00891, filed Oct. 26, 1999.

FIELD OF THE INVENTION

The invention relates to transmission network configuration, especially to an automatically configurable transmission network in the Abis interface of a radio system.

DESCRIPTION OF THE BACKGROUND

Modern radio networks are highly complicated systems comprising several different network components, such as base stations, base station controllers, mobile services switching centres, different transmission networks and cross-connection devices. When networks extend or the need for capacity increases, building radio networks and extending existing networks becomes a demanding and complex procedure that requires a great deal of planning, time and work.

FIG. 1 illustrates an example of a radio system comprising a base station controller 100, a cross-connection unit 102, three base stations 104 to 108 and a network management system unit 110. The base station 100 is connected by telecommunication connections 112 to the cross-connection unit 102 to which, in turn, the base station 104 is directly connected, and to which the base stations 106 to 108 are coupled in series such that information supplied from the base station controller to the base station 108 is transmitted via the base station 106. By means of existing methods, each element has to be manually configured in situ one network element at a time according to pre-calculated parameters and schemes. Thus, the management connection has to be established manually.

In digital systems information between the network elements is typically transmitted in frames comprising a plurality of time slots. For example in the digital GSM system, a connection between a base station and a base station controller is called an Abis interface. Typically, the connection is a frame connection and comprises 32 time slots transmitting traffic at a 64 kbit/s transmission rate, the total capacity thus being 2 Mbit/s. FIG. 2 illustrates an Abis interface, which consists of 32 time slots (TIME SLOT 0, TIME SLOT 1, TIME SLOT 3 1) each having a capacity of 64 kbit/s. Each connection between a base station and a base station controller takes up some time slots 205 from said frame 210. The number of time slots 205 per base station varies depending on the size of the base station and the capacity of the traffic channel.

When network elements, either cross-connection units or base stations, are to be added to an existing system similar to the system according to FIG. 1, for example, known remote control methods are no longer feasible. When the equipment is physically installed and connected either to an existing or to a built telecommunication connection with the system, the telecommunication connections between a base station and a base station controller must be designed and configured in detail at gate, time slot and partial time slot levels. As far as a network element to be installed is concerned, settings must be fixed by installation personnel in order to enable a management connection to the base station controller to be established, whereupon settings for a new base station can also be fixed from the management unit either manually or by software. Hence, to add a new element is a time-consuming and demanding procedure also susceptible to errors. In order to test a new base station and the telecommunication connections allocated thereto, the base station installation personnel must communicate with the network management personnel. This requires detailed task coordination between the management personnel and the installation personnel so as to avoid unnecessary waiting times.

The methods known in the art disclose that each of the described elements are configured manually on-site, one circuit (transmission connection between the elements) at a time, according to previously calculated parameters and a plan. This configuration work can be automated. Incorporated herein by reference are the PCT Patent Applications PCT/FI99/00351, PCT/FI99/00350 and PCT/FI99/00353, wherein an automatically configurable transmission network is presented. The system described in these patent applications is the preferred operating environment of the current invention, although it is, in principle, suited for any transmission network.

BRIEF DESCRIPTION OF THE INVENTION

The present invention seeks to provide an improved method of automatically configuring a transmission network. According to an aspect of the present invention, there is provided a method for configuring cross-connections of a radio system as specified in claim 1. According to an aspect of the present invention there is provided a radio system as specified in claim 4.

The preferred embodiments of the invention are disclosed in the dependent claims.

The invention provides several advantages. The amount of necessary manual work decreases significantly. Automation enables potential errors and, consequently, costs to be reduced. Network element installation requires no special and expensive training since automation also reduces the amount of necessary work on the installation site.

THE LIST OF DRAWINGS

Embodiments of the present invention are described below, by way of example only, with reference to the attached drawings, in which FIG. 1 illustrates an example of a radio system;

THE DESCRIPTION OF EMBODIMENTS

The invention will be described in the following mainly using a GSM-type cellular radio system as an example without, however, being restricted thereto in any way. It will be obvious to those skilled in the art that the solution of the invention can be applied to any digital data transmission system wherein data transmission connections between the network elements are implemented using a time-divisional frame structure.

Figure 1:
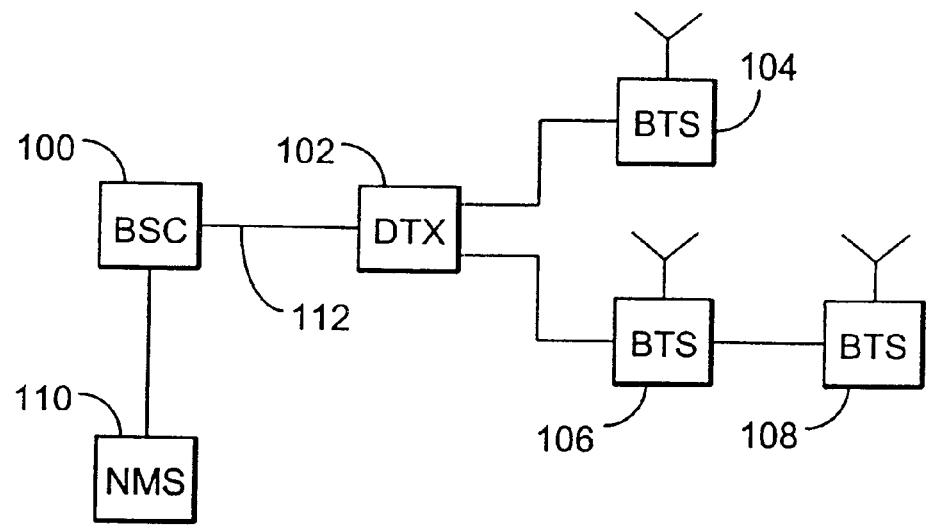
Figure 2:
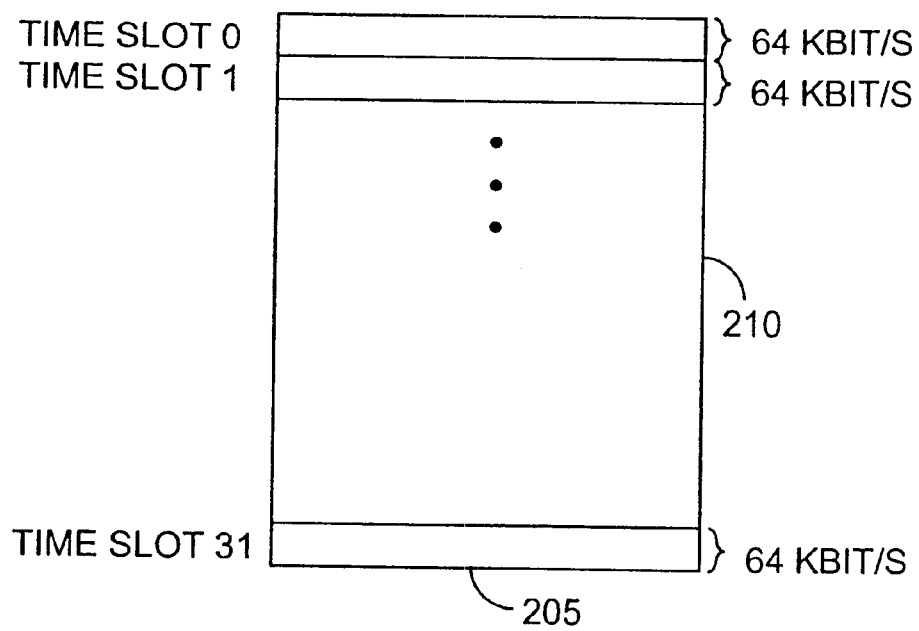
FIG. 2 illustrates an Abis interface.
Figure 3:
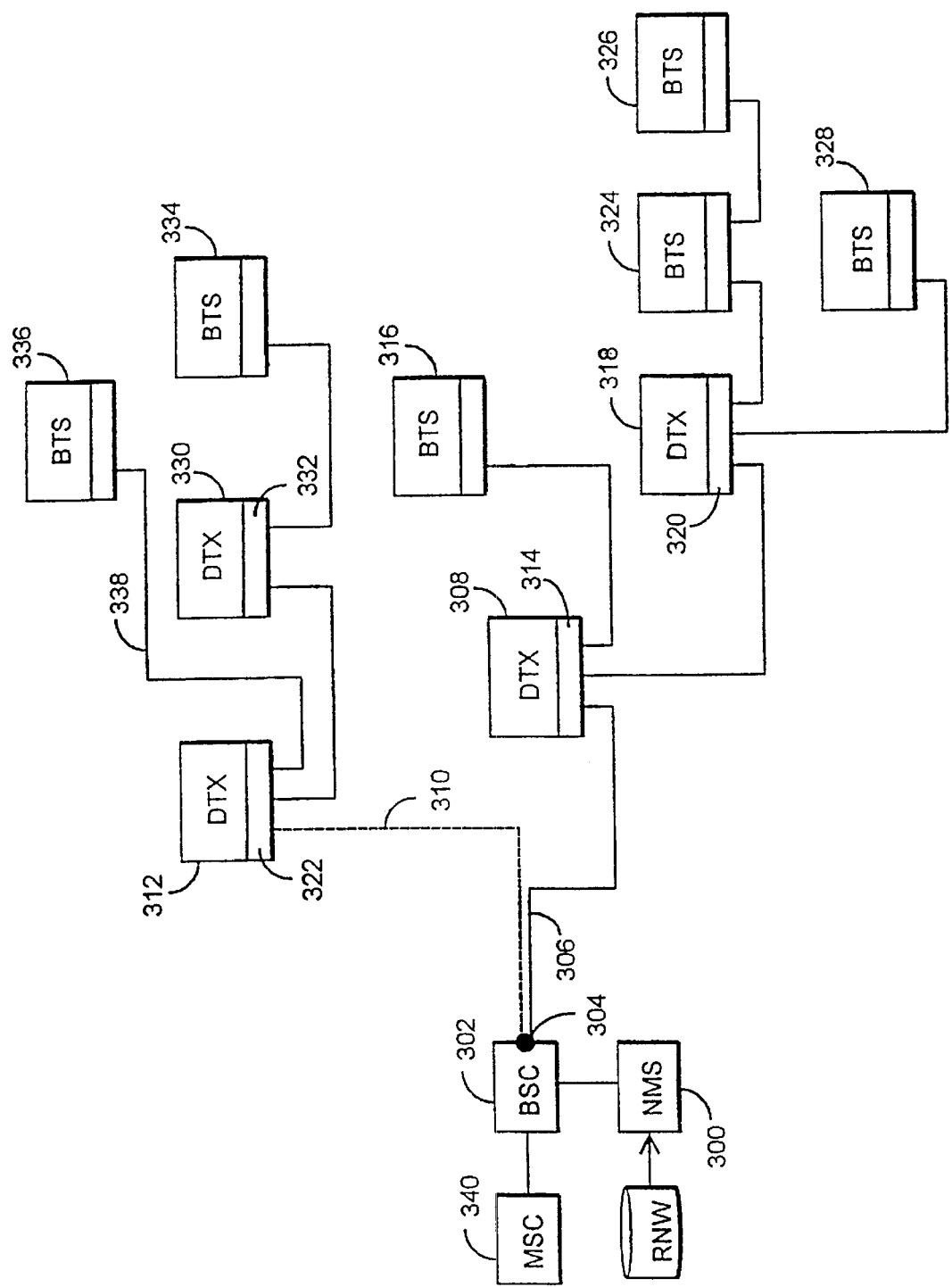
FIG. 3 shows an example of the radio system.

FIG. 3 illustrates an example of a radio system comprising a network management system NMS 300 to enable the operation and operating parameters of the network to be controlled and monitored. The system further comprises a base station controller 302 controlling the operation of base stations located in its area. By means of a gate 314 and a first telecommunication connection 306, first cross-connection unit 308 is connected to an output gate 304 of the base station controller, and second cross-connection unit 312 is connected to the output gate 304 of the base station controller by means of a gate 322 and a second telecommunication connection 310. A base station 316 and third cross-connection unit 318 are connected to a telecommunications gate 314 of the first cross-connection unit by means of a gate 320. A base station 324 is connected to the gate 320 of the third cross-connection unit 318, and a base station 326 is coupled in series with the base station 324. A base station 328 is also connected to the gate 320 of the third cross-connection unit 318. Fourth cross-connection unit 330 and a base station 336 are connected to the gate 322 of the second cross-connection unit 312 by means of a gate 332. A base station 334, in turn, is connected to the fourth cross-connection unit gate 332. The system further comprises a mobile services switching centre 340 controlling the operation of the network and transmitting calls to the other parts of the network and to other telecommunication networks, such as a public network. Telecommunication connections between the system devices, such as the connections 306, 310 or 338, can be implemented in ways known to those skilled in the art, for example by means of cabling or micro wave radios.

Figure 5:
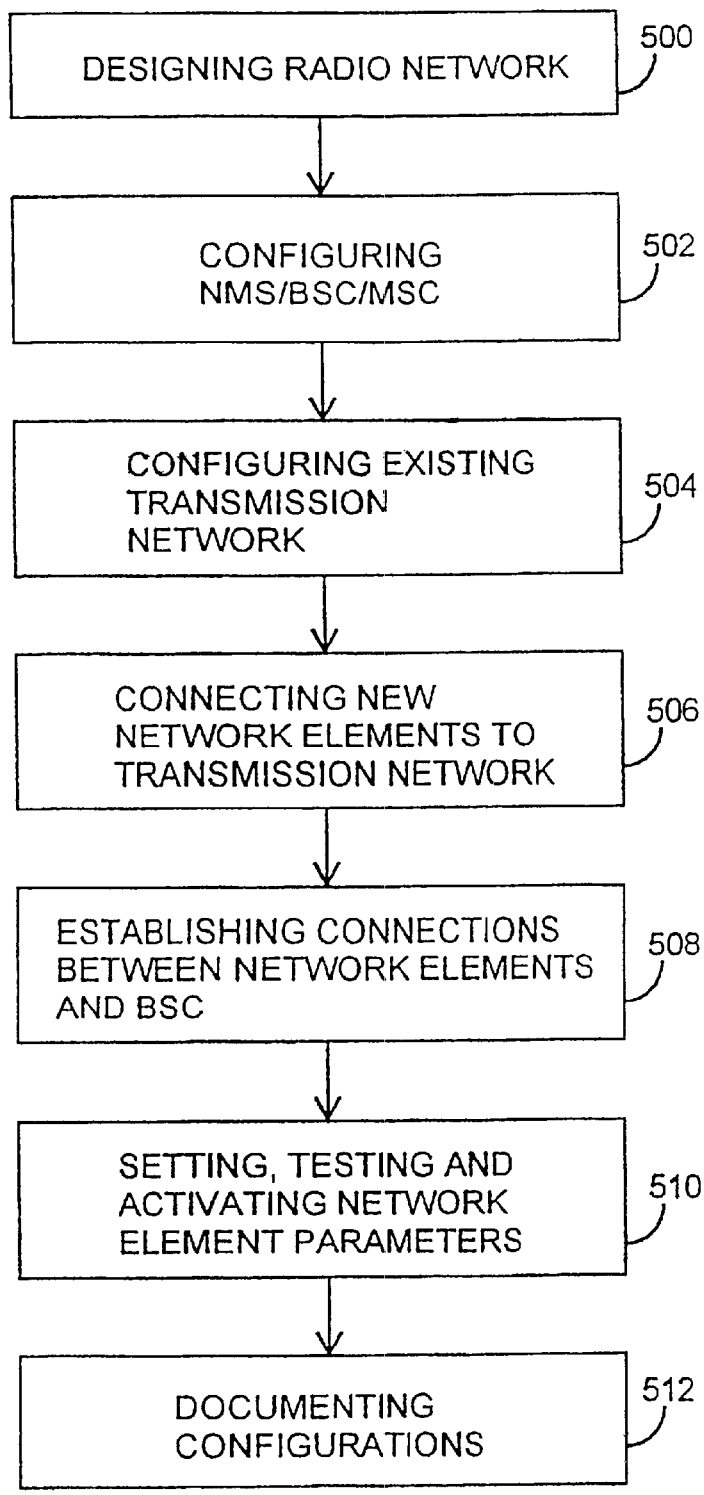
FIG. 5 is a flow diagram illustrating procedures necessary for building or extending the radio system.

By means of a flow diagram shown in FIG. 5, let us examine next the necessary procedures for building or extending the radio system. Most network element installation procedures are automatized, but, of course, all procedures cannot be automatized. The disposition and radio channel design of the radio system's base stations 316, 324, 326, 328, 336 and 334 must be performed in advance using the required radio network designing tools. This is executed in step 500 of FIG. 5. In this step, base station locations and each base station's identification information identifying each base station controlled by the base station are determined. Subsequently, it is to be determined how much transmission capacity each base station needs over the telecommunication connections 306, 310 between the base station and the base station controller 302.

Next, the radio system is configured in step 502. The radio system scheme is fed into the network management system 300, which creates network objects for the base station controller, i.e. determines the network elements. At the same time, transmission groups are created; in frames that are used for communication with the network elements by the base station controller, unused consecutive time slots of the frames are divided into one or more groups. These groups can be called transmission groups. The base station controller automatically creates one time slot for each group, the time slot being used as a communication control channel as regards time slot allocation from said group. In this step, free time slots are not allocated for the use of any particular network element.

Concurrently, the mobile services switching centre 340 can be configured for new network elements.

Next, the existing transmission network of the radio system is configured in step 504. Unused-time-slot groups are transmitted as whole groups in the frames and forwarded in the network from the output gate 304 of the base station controller to network elements to which the base stations can be connected, i.e. typically to cross-connection units. Let us assume in this example that in the figure, the time slot groups can be transmitted to the equipment 308 (and to the gate 314 thereof) and the equipment 330 (and to the gate 332 thereof). The transmission can be performed by software, for example by means of the network management system, if the transmission line 306 is suited for the transmission, or manually at the cross-connection unit. Let us assume in this example that the transmission line 306 and the first cross-connection unit 308 support the remote setting performed by software.

Let us assume further that the second cross-connection unit 312 is not capable of processing time slots as whole groups in the frames. Such a situation occurs for example when the system is old, comprising old equipment lacking necessary logic and data processing capacity. This equipment and the more intelligent cross-connection unit immediately behind the equipment must then be processed manually. Hence, in the present example, the connection from the base station controller passes to the gate 332 in the cross-connection unit 330, and the settings are manually fixed at the cross-connection unit 330.

The groups are transmitted as a whole from one gate to another, but the absolute group disposition in a frame may vary. This is illustrated by way of example in FIG. 4.

Figure 4:
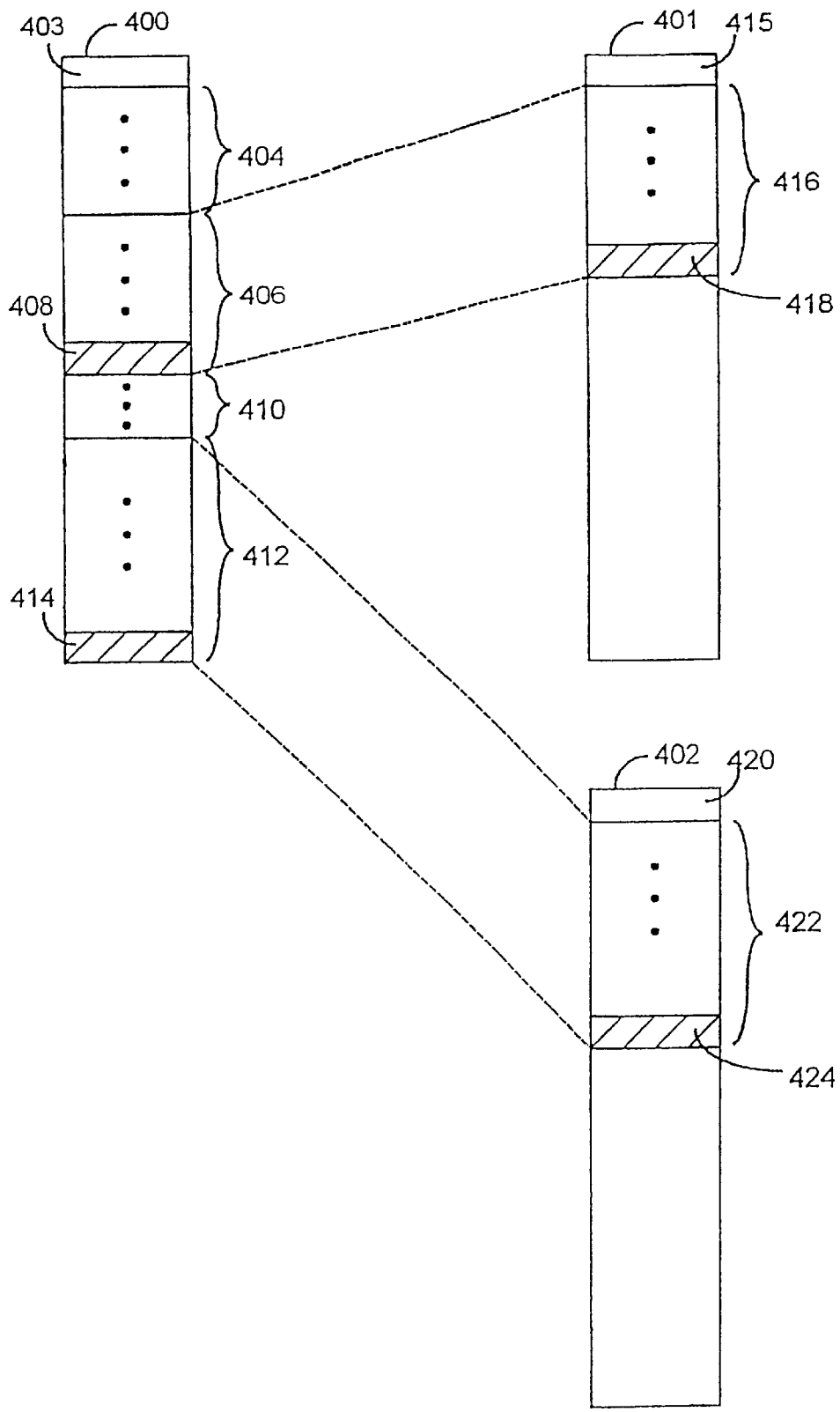
FIG. 4 illustrates an example of an interface between a base station controller and a network element.

FIG. 4 shows a frame 400 in the output gate 304 of the base station controller 304, a frame 401 in the gate 314 of the first cross-connection unit 308, and a frame 402 in the gate 332 of the fourth cross-connection unit 330. Each frame thus comprises 32 time slots. The transmission capacity of each time slot is 64 kbit/s. The total transmission capacity of a frame is thus 2 Mbit/s. Let us assume that a first time slot 403 is used for transmitting link management information. Let us assume further that next time slots 404 are allocated to another purpose. Next time slots 406 comprise a first group of free time slots. One of the time slots in the group, preferably a last time slot 408, is used as a communication control channel of the group as regards time slot allocation from said group. Next time slots 410 of the frame 400 are, again, allocated for other connections. Next time slots 412 comprise a second group of free time slots. Again, one of the time slots of the group, preferably a last time slot 414, is used as a communication control channel of the group as regards time slot allocation.

The first free-time-slot group 406 is transmitted from the output gate 304 of the base station controller 304 to the gate 314 of the first cross-connection unit 308. A first time slot 415 of the frame 401 in the gate 314 is used for transmitting link management information. Next time slots 416 comprise the first free-time-slot group. A last time slot 418 of the group serves as the communication control channel. The time slot disposition of the group in the frame can thus vary in different gates.

The second free-time-slot group 412 is transmitted from the output gate 304 of the base station controller 304 to the gate 332 of the fourth cross-connection unit 330. A first time slot 420 of the frame 402 in the gate 332 is used for transmitting link management information. Next time slots 422 comprise the first free-time-slot group. A last time slot 424 of the group serves as the communication control channel.

It is to be further noted that the free-time-slot group division shown here is only a simplified example. Naturally, in a real situation there can be more groups and they can be transmitted to cross-connection units in ways different from the one described above, for example several groups can be transmitted to the same cross-connection unit.

Next, new network elements are installed in the radio system and connected to the existing transmission network in step 506 of FIG. 5. If a base station to be installed in the system is directly connected to a cross-connection unit not supporting time slot processing in groups, such as the cross-connection unit 312 in the example of FIG. 4 to whose gate 322 the base station 336 is connected, the cross-connection unit gate must be manually activated in order for the base station 336 to receive a 2 Mbit/s frame over a transmission line 338.

In this step, network elements to be installed are physically connected to the system by means of telecommunication connections. If necessary, the required telecommunication connections must be built. In connection with the physical installation, network element identification information is fed into the network element to identify each base station controlled by the base station controller.

Next, connections are established between the new network elements and the base station controller in step 508 of FIG. 5. Connections are established automatically without the network element installer being compelled to perform other procedures than switching on the element installed. After being physically installed, the new network element is arranged to search the frames received by means of the telecommunication connections for group communication control channels and to identify free groups by means of the communication control channels found, as is described in the PCT Patent Application PCT/FI99100351.

When a communication control channel is found and the base station controller accepts the network element, connection establishment continues controlled by the base station controller. The base station allocates a necessary number of time slots from the free-time-slot group indicated by the communication control channel for the communication of the network element and the base station controller and transmits information about this to the network element. The time slots are marked as allocated at both ends of the connection and also at the cross-connection unit possibly located on the transmission path.

The connections between the network elements and the base station controller being thus established in step 508 of FIG. 5, the process proceeds to step 510, wherein the network element is configured. The configuration is continued controlled by the base station controller. If necessary, the base station controller downloads software into the network element. The base station controller also downloads necessary radio network parameters into the network element. Next, the base station controller tests the operation of the network element hardware and the allocated time slots.

In step 512, the network element configuration is documented. If the network element passes the tests conducted by the base station controller, the element installer is notified of this. The base station controller informs the network management system of the new network element and the time slots allocated thereto. The network element is now ready to be used.

Precautions against errors can be taken by first connecting the capacity required by the base station as a temporary cross-connection, and after having secured by testing that the connection works, the cross-connections are changed into permanent ones. It is to be noted here that the procedure described above is only one example. The order in which some of the above-described functions can be performed may vary.

Figure 6:
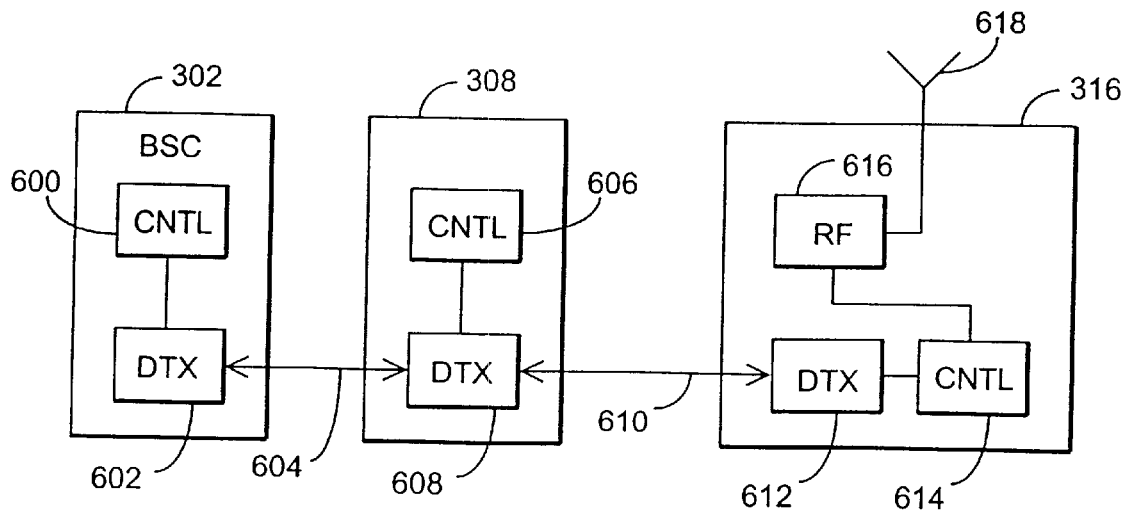
FIG. 6 illustrates an example of the structure of the base station controller, cross-connection unit and base station of the radio system.

Examples of the structure of the base station controller, cross-connection unit and base station of the radio system are illustrated for the relevant parts in FIG. 6. The base station controller 302 comprises a control unit. The base station controller further comprises transmission equipment 602 by means of which it is connected 604 to the cross-connection unit 308. The cross-connection unit 308 typically comprises a control unit 606 and transmission equipment 608 by means of which it is connected 610 to the base station 316. The base station 316 typically comprises transmission equipment 612, a control unit 614 and radio frequency parts 616 by means of which a desired signal is transmitted to mobile telephones via an antenna 618. The control units 600, 606 and 614 are typically implemented by means of general processors, signal processors or memory elements.

Procedures required by the method of the invention in the base stations and the base station controller can preferably be performed by software using commands stored in control processors. The base station controllers, cross-connection unit and base stations of the radio system naturally also comprise other components than the ones shown in FIG. 6, as is obvious to those skilled in the art, but being irrelevant to the explanation they are not shown in FIG. 6.

Figure 7A:
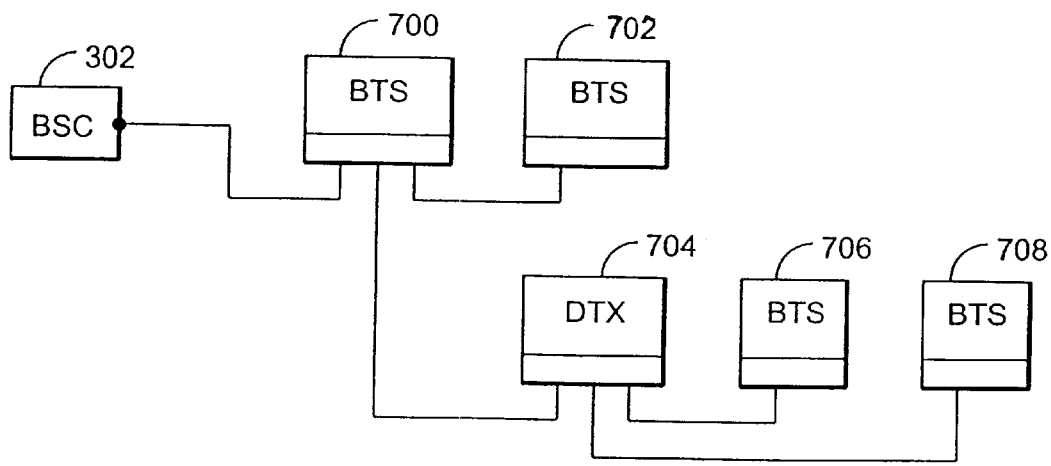
FIGS. 7A and 7B illustrate examples of transmission topologies.
Figure 7B:
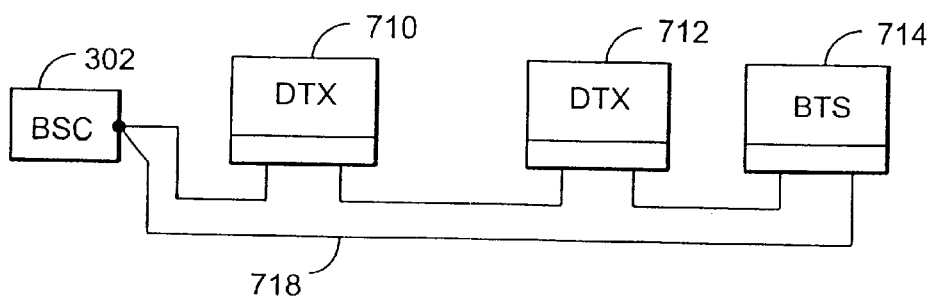

The solution is not restricted to the transmission topologies shown in FIG. 3, as is obvious to those skilled in the art. FIGS. 7A and 7B illustrate further examples of transmission topologies. In FIG. 7A, the system comprises the base station controller 302 connected to a base station 700, connected, in turn, to a base station 702 and cross-connection unit 704. The cross-connection unit 704 is connected to base stations 706 and 708.

In FIG. 7B, the system comprises the base station controller 302 connected to a cross-connection unit 710. The cross-connection unit 710 is connected to a second cross-connection unit 712, and the second cross-connection unit 710 is connected to a base station 714. The figure also illustrates a loop connection 718 which ensures the maintenance of the connection between the network elements and the base station controller.

Basically a network element comprises usually ASICs (Application Specific Integrated Circuit) for performing the operations that need to be very fast, and then software for controlling the ASICs. The software residing in the network element can be divided into the application SW and management SW, for example. Application SW is software performing tasks in order to achieve some needed functionality. The management SW is kind of an interface of the network element towards the management system, either the central network management system or a local element management software. Element management software is usually software that resides on a portable computer that can be plugged into a communication port of the network element. The management SW can also offer some required functionality.

Next a method for automatically uploading a transmission network circuit topology is presented. Transmission network topology is automatically uploaded into the network management system 300, where the topology is presented, monitored or maintained. The transmission network topology is understood as a set of logical or physical connections 310, 338 between transmission network routing elements or interconnection points 312 which describe the logical operation and routes to a specific network element 336.

A transmission network which is under construction or modification faces continuous modifications regarding the cross-connect circuit routing, circuit status and logical circuit end-to-end configuration. The network management system 300 which monitors and controls the transmission network should be up-to date in every situation. Due to the delays, missing links or circuits in the network, the network management system 300 faces a non-coherent situation during the buildup phase. To prevent information loss or blocking of interfaces of the network management system 300, uploading is performed automatically.

Additionally, the physical topology of network elements, i.e. which elements are connected to which and which PCM ports are connected to which, is usually entered into the database of the network management system 300 by hand. Even if the uploading of cross-connection settings from the network elements 308, 312, 318, 330 is automated, the information is meaningless on network level, if there is a mistake in the physical port connections, or if the connections are reported incorrectly by the installation personnel.

In this context, the transmission network cross-connection units 308, 312, 318, 330 contain intelligence to perform the automatic configuration for the circuit banks and cross-connection unit described above. The cross-connection units also have other active applications performing different tasks and they reserve, modify or update the status of that particular transmission unit.

As the application software located in each transmission unit is finishing it tasks, it will indicate to the management software of the transmission unit that it tasks are completed, mark the circuit label as changed, inform other applications, and give intermediate status of each cross-connect circuit, as they have changed. The indication is performed by sending an automatic configuration change notification. This information is automatically maintained, stored and checked in the particular network element only, and each network element is the main information source to the network management system 300. The configuration data is stored in the non-volatile memory of the unit, and thus the central network management system 300 can update it's topology information and cross-connect status in each element to the most coherent information.

Every unchanged situation is not automatically notified to the network management system 300, this happens only if the management software of the network management system 300 requests a full, partial or particular update concerning this transmission unit, a part of the same transmission network, or even a full segment of the transmission network under said operation.

The method to perform said change configuration is based on the naming convention of the transmission circuit described below, i.e. a method for configuring cross-connections in a transmission network. This method enables the use of a circuit class-mark such as priority, label, and application which created the circuit.

The main idea is thus to mark the circuit in the management software of the transmission unit as "changed" or "archived" or in another predefined way, and to submit this information to all applications executing in the network element. This then triggers the status update process which transfers the changed circuit information to the central transmission network management system 300. Thus, we avoid unnecessary signaling between the network elements 308, 312, 318, 330 and the network management system 300.

When the network management system 300, or whatever central system is used to store the network topology information, uploads circuits, regardless of whether this concerns all the circuits or only a portion of the circuits, it marks them as having been read. This is done by removing the changed flag associated with each circuit. When another client, such as a local management tool or an auto-configuration process, reads the changes, the changed flag is not cleared. Only the central network management system 300 can clear the flags. This way, the network management system 300 always has the latest information at all times. If this were not the case, a local reading of the circuit information would result in a loss of information for the network management system 300.

The method described above serves to ensure an accurate uploading of circuits within the network elements, but does not ensure that the physical topology information in the network management system 300 is correct. By taking advantage of the LAN (Local Area Network) connection across the transmission medium, as described in the PCT Patent Application PCT/FI99/00353, this can be ensured. A cross-connection unit has a communication link with an other cross-connection unit through the physical ports of each equipment. When a new physical connection is established between two network elements, the processors communicate with each other through every port, sharing identification information and port information. Thus, each network element can associate each of its own ports with the name and connection port of its neighbors. By means of a network management connection to the network element, the network management system 300 can upload this port-specific connection information. With this information, the network management system 300 can automatically place the new network elements in their correct physical locations, and can be certain of the actual connections in the network at a physical level.

The benefits gained from this type of distributed configuration change monitoring method is that blocking or overloading of the controlling links between the network element and the network management system 300 is minimized and response time in delivering the correct change information to applications requiring this information in their operation is optimized.

Further, the total time in performing end-to-end management is reduced, which makes automatic updating of the system data possible. This means that the topology of the transmission network is updated rapidly and automatically allowing the network build-up time, integration and commissioning time to be reduced to a fraction of the present situation where there are no automatic mechanisms for topology or configuration monitoring.

Even further, the physical topology of the network is known with certainty, without the errors possibly introduced by manually drawing connections between different network elements in the network management system 300 center.

Next, a method for configuring the cross-connections in the transmission network is presented. A physical and application-independent solution is described for delivering information about transmission circuits and cross-connections in telecommunications or data networks where the transmission media is transparent to the applications. The invention concentrates on circuit bank level or transmission media end-terminal level, where the identification of each circuit, its type and usage, as well as the connection type and destination are configured and maintained. This enables the transmission equipment and management systems to keep track of the current configuration in such networks.

The need for updating the configuration and topology requires a method to reliably manage the physical or logical routes between transmission units. The presentation of the network topology is according to the prior art based on collecting manually the needed information from the network elements, which is quite labor-intensive task. Other solution known in the art is to centrally insert network planning information into the network management system 300, the problem then being that the network planning information is usually not up-to-date information because of the changes that have taken place in the physical network.

A transmission network consists of physical media carrying the payload traffic, interconnection points or cross-connect points to switch the payload traffic to a desired destination and corresponding cross-tables within a circuit bank. A circuit based approach to the presentation and configuration of cross-connections is derived.

The circuit naming convention and class-marks are introduced in the following. The following Table 1 presents a port of a circuit bank. The capacity available in the port 314, 320, 322, 332 has been divided between different applications. From the point of view of traffic routing, this reserving of capacity for different purposes happens in the same way for all applications.

Class-marks are allocated for the individual circuit banks: application type, priority and label. Every circuit belonging to a certain application belongs to the same circuit class. Each time capacity is reserved for a certain application, a label must be given to the circuit to be formed. This label can later be used to refer to the circuit. Note that in the case of auto-configuration what we have is not really a circuit since the other end of the circuit is initially nothing. The capacity has to be reserved for auto-configuration to work.

A priority is assigned to each circuit class. Priority means the user access or application level needed to change the circuit. There are four levels of priority, 1 being the highest. In order of diminishing priority they are control, payload, auto-configuration and read-only. The picture presents circuit classes, their priority and the circuit labels assigned to them.

The class-marks are applied to each network element, circuit bank and cross-connect unit automatically.

TABLE 1

| Application/Circuit Class | Priority | Label(s) | |
|---|---|---|---|
| Payload | 2 | Company 1200k | Company 21M |
| Free Auto-configuration | 3 | Nokia A | |
| Free Control | 1 | Q1Ctrl | |

Different pieces of equipment are capable of configuring circuit banks. BSC is the network element controller, EM the local network element management tool, and NSM is the network management system. They operate on different priority levels as presented in Table 2.

TABLE 2

| Equipment | Priority |
|---|---|
| BSC | 2 |
| EM | Selectable |
| NMS | ? |

Applications, which use the circuit bank, scan the marked circuits and cross-connections. The applications are active or passive software executing in the base station controller 302, the transmission unit of the base station 336, the transmission unit of the cross-connection unit 312, the transmission card of a micro-cellular base station configured with the BCF (Base Control Function) and TRX (Transceiver) functions, the network element controlled by the network management system 300, or the user-controlled local management software. The applications check the status of the circuit by reading the labels, interconnection information and circuit configuration. This enables the execution of the following configuration activities:

Network element status information check
Network element connection update
Circuit status information
Circuit update information
Network management information interchange.

Active applications follow the priority schema. The marked and reserved parts of a certain circuit bank are processed in applications as the priority allocated to each circuit requires, and thus the operation of the changes in configuration management or local management receives a working order. This prevents the independent transmission equipment or network management software to have conflicting activities during the auto-configuration phase, or any local configuration phase. The following activities will then be synchronized and prioritized:

Network element status upload
Auto-configuration process
Network Configuration processes
Local management tool process.

As the applications are prioritized, the automatic processes will have a proper functionality and the information they produce is consistent Applications use a connect or circuit label. The circuit bank information update is achieved on application level or even on cross-connect level when the established connections are labeled according to their end usage, creating application or management system. This method can be implemented in the transmission bus structures, in a manufacturer-specific Q1E structure or in any equipment delivering multiple time-slot circuit banks in different transmission media including ITU (international Telecommunications Union) specified E1, T1 links, ISDN (Integrated Services Digital Network), HDSL (High-Speed Digital Subscriber Line) or ATM (Asynchronous Transfer Mode) type transmission systems.

Next, a method for optimizing transmission capacity of the transmission network is presented. Circuit-level transmission network optimization is a complex task to produce a smoothly packed and non-scattered transmission circuit bank. Optimization is needed for removing idle time-slots from the circuit bank in order to allow the largest possible capacity to fit into the transmission network's channel, which can represent e.g. a 2 Mbit/s or 1.5 Mbit/s E1/T1 channel, HDSL, ATM, ISDN or any other time-division transmission media channel type.

Another reason for transmission network optimization is to pack the payload traffic into several different transmission channels and thus gain a better cost optimization per transferred byte. To enable this packing type we need to automate the circuit bank optimization also on a higher network level.

The information about the fragmentation of the transmission link 306, 310, 338 is obtained by letting the automatic optimization application software to analyze the logical circuit connection through a mechanism which is described above as a method for uploading a transmission network topology. The current method describes the mechanism which enables the usage of the capabilities of the local network element to report both its logical configuration on cross-connect level within a circuit bank and also the physical connection through a mechanism that reports to the management system the physical port-to-port connection from the incoming and outgoing ports of the network element. This is the basis for this method for automating the optimization process.

First the planning of the transmission and radio network is done. Then primary data for self-configuring or auto-configuring the transmission network is transferred to the base station controller 302 and the network management system 300. Thus, a transparent transmission network between the network element and the base station controller 302 or a transport network is formed automatically by allocating transmission capacity to the network elements.

The optimization is needed after a certain allocation method is used to assign time slots of the transmission network transport connections for the payload traffic. Fragmentation could take place as new allocation is added. The method could be either manual or automatic allocation done while the network is being implemented or modified. Here, the transmission connections are referred to as time slots in well known 2 Mbit/s or any other time-slot-based transportation method.

An automatic optimization algorithm, which analyses the fragmentation of a circuit bank's logical configuration, uses the labeling and application-based naming of physical transmission circuits described in the above method for configuring cross-connections in a transmission network. The naming and circuit connection configuration reports are stored either in the management unit of the local network element or in the nearest network level network element which stores its sub-circuit topology and physical connections on port level.

Optimization takes place when the fragmenting increases above a certain percentage of the total capacity of a circuit, a circuit bank or a set of circuit banks. Therefore, the capacity needed for each application, or payload traffic, could be organized into a bulk of transmission circuits under one application name.

In the case of automated cross-connections, when neighboring network elements request cross-connections to deliver auto-configuration capacity, for example, the circuits are always connected in such a way as to minimize fragmentation by default. This can be done by always connecting the circuit beginning at the first free time slot, which leaves as big a free portion of the entire capacity as possible.

What is achieved through the described method, is that the spare capacity remaining between the automatically or manually allocated circuits or banks will be minimal. When the transmission network itself evolves through different stages of operational usage, the need for capacity and the utilized capacity varies with time.

Therefore, net usage is not always optimal, even when automatic allocation takes place. Certain parts of a logical or physical connection are tightly packed, but the timely dispersion fragments the usage of the offered capacity. This method can be used to maximize the usable size of the transmission media.

It is important to note that the automated optimization application need not reside in a central location, such as the network management system 300. It can equally reside in the network elements themselves. If such a mechanism is allowed by the operator, i.e. if the feature is switched on, the network elements themselves can agree to 'de-fragment' the links between them continually. This may cause a slight break in traffic, so it must be an optional feature. This autonomous mode of optimization is enabled by the processor-to-processor communication connection across the transmission medium, as described in the PCT Patent Application PCT/FI99/00353. The current method is not limited to using the described method in any particular transmission media. In Table 3, two examples of optimized capacity usage in one base station are presented: first the transceiver TRX1 receives the required transmission capacity (expressed in time slots TS) via the first 2 Mbit/s transmission line, and the second transceiver TRX2 receives the required capacity via the second 2 Mbit/s transmission line.

TABLE 3

| TRX | TS | BITS 1–2 | BITS 3–4 | BITS 5–6 | BITS 7–8 |
|---|---|---|---|---|---|
| TRX1 | 29 | TCH1/1–2 | TCH2/3–4 | TCH3/5–6 | TCH4/7–8 |
|  | 30 | TCH5/9–10 | TCH6/11–12 | TCH7/13–14 | TCH8/15–16 |
|  | 31 | 64K OMTRXSIG |  |  |  |

TABLE 3-continued

| TRX | TS | BITS 1–2 | BITS 3–4 | BITS 5–6 | BITS 7–8 |
|---|---|---|---|---|---|
| TRX2 | 1 | TCH1/1–2 | TCH2/3–4 | TCH3/5–6 | TCH4/7–8 |
|  | 2 | TCH5/9–10 | TCH6/11–12 | TCH7/13–14 | TCH8/15–16 |
|  | 3 | 64K OMTRXSIG |  |  |  |

Although the invention has been described above with reference to the examples in the accompanying drawings, it is obvious that the invention is not restricted thereto but it can be modified in many ways within the scope of the inventive idea disclosed in the attached claims.

What is claimed is:

1. A method for configuring cross-connections of a radio system comprising:
    managing network elements by a network management system, the network elements being operatively interconnected by a transmission network having transmission circuits,
    transmitting information between the network elements in frames that are divided into time slots,
    providing at least one cross-connection unit between at least two network elements for providing cross-connections needed to establish the transmission circuits,
    uploading a transmission network topology of a radio system,
    utilizing labeled transmission circuits in analyzing the fragmentation of the cross-connections, and
    optimizing transmission capacity of a transmission circuit by reconfiguring the cross-connections when fragmentation of the transmission capacity exceeds an agreed percentage of the total capacity of the transmission circuit.

2. The method as claimed in claim 1, wherein the establishing the transmission circuits further comprises allocating a new transmission circuit the first free time slot.

3. The method as claimed in claim 1, wherein the optimizing further comprises performing reconfiguration by the network management system and by distributed software residing in the network elements.

4. A radio system comprising:
    network elements and a network management system managing the network elements, the network elements being operatively interconnected by means of a transmission network having transmission circuits,
    information between the network elements is transmitted in frames that are divided into time slots,
    at least one cross-connection unit between at least two network elements for providing cross-connections needed to establish the transmission circuits,
    software for uploading a transmission network topology of the radio system,
    labeled transmission circuits for analyzing the fragmentation of the cross-connections, and optimizing the capacity by reconfiguring the cross-connections when fragmentation of the capacity exceeds an agreed percentage of the total capacity of a circuit.

5. The radio system as claimed in claim 4, wherein a new transmission circuit is allocated the first free time slot.

6. The radio system as claimed in claim 4, wherein reconfiguration is performed by the network management system and by distributed software residing in the network elements.

* * * * *

UNITED STATES PATENT AND TRADEMARK OFFICE
Certificate

Patent No. 6,366,955 B1

Patented: April 2, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Esa Henrik Haakana, Espoo, FI; and Mark Derek Sellin, Twickenham, GB.

Signed and Sealed this Eighteenth Day of November 2003.

MENG-AI AN
*Supervisory Patent Examiner*
*Art Unit 2154*